Oct. 21, 1930.    J. R. FRY    1,778,894
RELAY
Filed Dec. 23, 1927
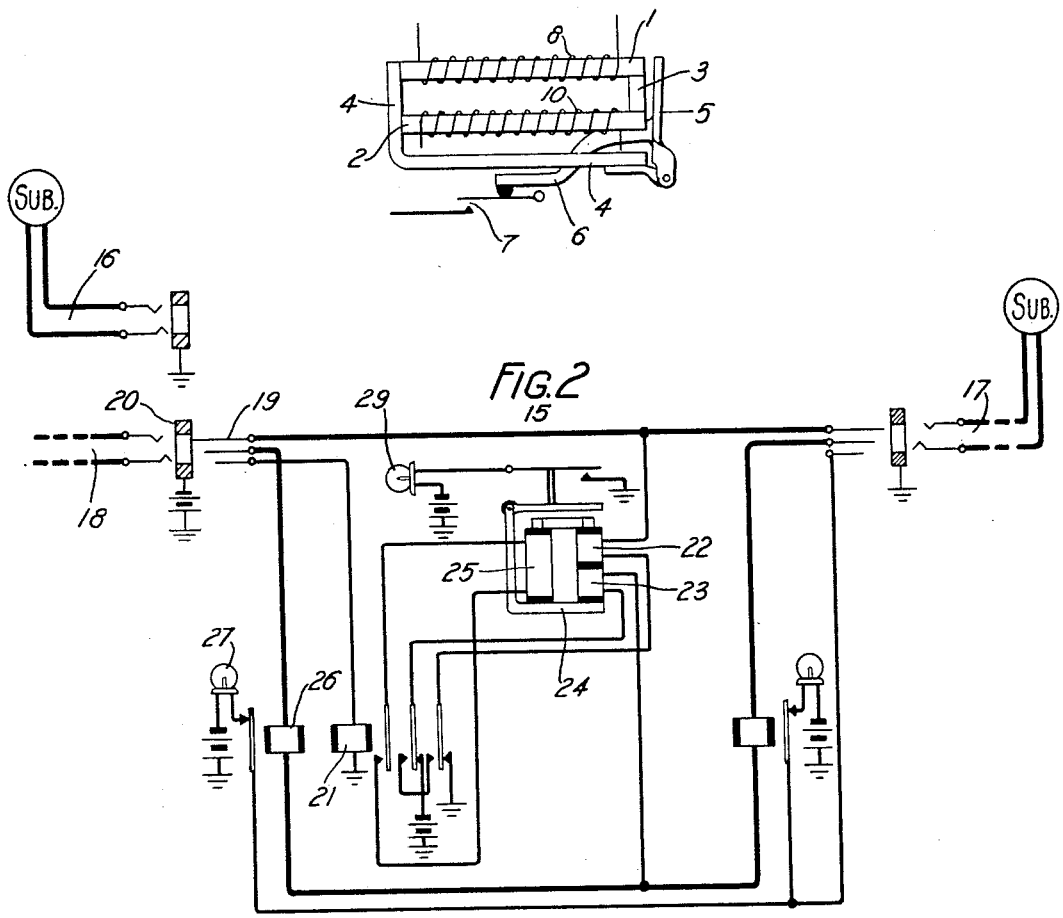
INVENTOR
JACOB R. FRY
BY McKenney
ATTORNEY Patented Oct. 21, 1930

1,778,894

UNITED STATES PATENT OFFICE

JACOB R. FRY, OF MONTCLAIR, NEW JERSEY, ASSIGNOR TO BELL TELEPHONE LABORATORIES, INCORPORATED, OF NEW YORK, N. Y., A CORPORATION OF NEW YORK

RELAY

Application filed December 23, 1927. Serial No. 242,113.

This invention relates to relays and particularly to relays arranged for operation on alternating current.

Its object is to render a relay responsive to the flow of alternating current and unresponsive to the flow of direct current through its winding.

Various types of relays have been designed heretofore to operate on alternating current. These relays have not been sufficiently reliable, however, and difficulty has been encountered in guarding against their operation when direct current is applied to them.

According to the present invention a relay has been provided which is responsive to alternating current but not to direct current, by having a magnetic structure comprising two cores forming a closed magnetic circuit, an armature and a separate magnetic circuit including the cores and armature. An operating winding is wound on one core and a short-circuited winding on the other core in such manner that the relay attracts its armature when alternating current flows through the operating winding, but does not attract its armature in response to direct current.

This invention has been illustrated in the accompanying drawings in which Fig. 1 shows in general the physical arrangement of a relay structure embodying the invention, while Fig. 2 shows the use of this relay in a cord circuit.

Referring now to the drawings the relay embodying operating characteristics in accordance with this invention may be designed along the lines shown in Fig. 1. For example, the relay may consist of two parallel magnetic cores 1 and 2 connected together at one end by member 3 of magnetic material and at the other end by member 4 of magnetic material to form a closed magnetic circuit. Member 4 also serves as a connecting pole-piece for a separate magnetic circuit from the two cores through the air gap between armature and cores, to the armature 5 and return pole-piece 4. The armature is pivoted at the free end of the pole-piece 4. The armature 5 is provided with an arm 6 for control of the contact 7. Core 1 is provided with a polarizing winding 8 and core 2 is provided with an operating winding 10.

The arrangement is such that if the polarizing winding 8 is short-circuited and the operating winding 10 is connected to an alternating current source the relay will attract and hold its armature in operated position, whereas if a direct current source is connected to the winding 10 only a negligible effect will be produced to attract the armature regardless of whether the polarizing winding on core 1 is short-circuited or not. When alternating current is applied to winding 10 it induces a voltage in the short-circuited winding 8 to cause a current to flow in a series opposing direction in this winding. This current produces a flux in core 1 to oppose that produced in core 2 for each half wave of the applied alternating current. This action causes an electromagnetic flux to pass through pole-piece 4, armature 5 and the air-gap between the armature and the cores to attract the armature, rather than through the closed magnetic circuit formed by the cores and the members 3 and 4. In other words an electromagnetic pull in the operated position will be produced to attract and maintain the armature (of twice the frequency of the voltage applied to winding 10 from the alternating current source).

On the other hand if the operating winding 10 is energized with direct current and if the polarizing winding 8 is short-circuited the current induced therein as the direct current is first applied, will naturally have only a momentary effect to oppose the steady flux from core 2. The flux from core 2 will therefore be short-circuited through the closed magnetic circuit formed by the two cores and the members 3 and 4 and consequently only a negligible flux will be effective to attract the armature while the direct current is applied. In case the polarizing winding is not short-circuited no effect whatsoever will be produced in core 1 to oppose the steady flux from core 2.

This relay is related to the two-step relay covered by my copending application, Serial No. 242,112, filed December 23, 1927. In the present case the polarizing current in winding 8 is an alternating current whose polarity changes so as to always oppose the alternating flux in core 2 produced by the alternating current in winding 10. Whereas in the above mentioned application the counteracting magnetization of core 1 is produced by a winding thereon energized by an external battery, and whose intensity is changed to various predetermined values by changing either the current or number of turns or both of the polarizing winding.

A circuit illustrating how a relay embodying this invention may be employed is shown in Fig. 2. This figure shows a cord circuit 15 of the general type used by private branch exchange operators to connect private branch exchange lines 16 and 17, or for extending a connection to a central office over a trunk 18.

If the cord circuit is used for a central office connection, insertion of plug 19 into jack 20 of trunk 18 causes the operation of relay 21 over the sleeve circuit as the sleeve of this trunk is connected to battery. The operation of relay 21 closes a bridge circuit from battery at the usual toll operator's cord at the central office over the tip and ring conductors of the cord, through windings 22 and 23 of the relay 24 and the two outer right-hand armatures and front contacts of relay 21. As relay 24 is designed in accordance with this invention it will not operate in this direct current circuit. The supervisory relay 26 however operates to open the circuit for the usual supervisory lamp 27.

It should be noted that the windings 22 and 23 are in effect equivalent to the operating winding 10 in Fig. 1 as they are connected in a series aiding relation. The two windings have been provided in this circuit in order to balance the line conductors when battery is supplied from the cord in a connection hereinafter described.

The polarizing winding 25 is short-circuited by the operation of relay 21 at the inner right-hand armature and front contact of this relay. With this circuit arrangement the toll operator may call the private branch exchange operator by applying alternating ringing current to trunk 18 over the above mentioned bridge circuit, and relay 24 will respond to the applied current and close a circuit for the ringing signal 29.

On the other hand if the cord circuit 15 is used to connect two private branch exchange subscribers' lines 16 and 17, relay 21 will not operate as the sleeves of the jacks of these lines are connected to ground. In this case talking battery is supplied for the private branch exchange subscribers from battery and ground connected at the two outer right-hand armatures and back contacts of relay 21, through the windings 22 and 23. These windings now serve to balance the circuit for the talking conductors of the cord in the manner well known in the art. In this case the polarizing winding 25 of relay 24 is not short-circuited and the direct current through the windings 22 and 23 will have no effect on the relay since in accordance with this invention energizing the windings on core 10 above will not operate the relay.

It should be understood that a relay of this character is not limited in its use to the circuit shown but may be applied to advantage in other systems where a relay having operating characteristics of this kind is desirable without departing from the spirit of the invention.

What is claimed is:

1. An alternating current responsive relay having only two cores magnetically connected at each end to form a magnetic circuit, an armature, a separate magnetic circuit between the cores and the armature, an energizing winding on one core, and a short-circuited winding on the other core.

2. A relay having an armature, a magnetic link and means including two windings to produce magnetic flux through the armature and the link to attract the armature only when one of said windings is short-circuited and the other is energized by alternating current.

3. A relay having an armature, a normally open winding arranged to be short-circuited, an operating winding, and means whereby when said first winding is short-circuited and said operating winding is energized by alternating current the armature is attracted, whereas when said operating winding is energized by direct current the armature is not attracted.

4. A relay having two cores magnetically connected at each end, an armature, a winding on each core, a separate magnetic connecting link between the cores and the armature so constructed that when one winding is short-circuited and the other energized by alternating current, flux is produced to pass through the connecting link to attract the armature and when said winding is energized by direct current no flux passes through the connecting link and the armature is not attracted.

5. A relay having an armature, two cores, an operating winding on one core and a short-circuited winding on the other core, a magnetic connection between the cores, a magnetic connection between the cores and the armature, said magnetic connections being so arranged that when the operating winding is energized by alternating current magnetic flux is produced through the connection between the cores and the armature to act on the armature, and when the operating winding is energized by direct current magnetic flux is produced to pass only through the cores and the magnetic connection between them.

6. A relay comprising a core structure, an operating winding and a short-circuited winding on said structure, an armature, a magnetic link having no winding connecting the core structure and armature and so associated with the core structure that when said operating winding is energized in one manner flux is caused to pass through the link for the operation of the armature and when said operating winding is energized in another manner flux is prevented from passing through the link to prevent the operation of the armature.

In witness whereof, I hereunto subscribe my name this 21st day of December A. D., 1927.

JACOB R. FRY.